United States Patent

[11] 3,618,675

| [72] | Inventor | Michael C. Hornung<br>Spearville, Kans. |
|---|---|---|
| [21] | Appl. No. | 824,742 |
| [22] | Filed | May 7, 1969 |
| [45] | Patented | Nov. 9, 1971 |
| [73] | Assignee | American Products, Inc.<br>Spearville, Kans.<br>Continuation of application Ser. No.<br>524,128, Feb. 1, 1966. |

[54] SPRING TOOTH ASSEMBLY
7 Claims, 4 Drawing Figs.

[52] U.S. Cl............................................... 172/707,
172/643, 172/771, 306/1.6
[51] Int. Cl............................................... A01b 23/02
[50] Field of Search................................. 172/682,
707, 708, 765, 643; 306/1.6

[56] References Cited
UNITED STATES PATENTS
| 359,518 | 3/1887 | Pratt.............................. | 172/708 |
| 369,508 | 9/1887 | Eisenhour...................... | 172/708 |
| 646,774 | 4/1900 | Whipple........................ | 172/708 X |
| 502,692 | 8/1893 | Perrin............................ | 172/643 X |

FOREIGN PATENTS
| 24,251 | 2/1895 | Great Britain................. | 172/707 |

Primary Examiner—Clyde I. Coughenour
Attorney—Thomas S. MacDonald

ABSTRACT: A soil-working agricultural spring tooth having a flat, vertical upper end, and acute-angled tip at the lower end terminating in a vertical plane rearward of the upper end, a generally horizontal convoluted connector section depending from the upper end and extending rearwardly, and an arcuate working section of reversed curvature extending from the tip to a substantially horizontal transition section connecting to the connector section, the transition section being in the same general horizontal plane as the point of transition between the upper end and the connector section.

PATENTED NOV 9 1971     3,618,675

INVENTOR.
MICHAEL C. HORNUNG
BY
*John H. Widdowson*
ATTORNEY

SPRING TOOTH ASSEMBLY

This is a continuation of application Ser. No. 524,128, filed Feb. 1, 1966.

Numerous spring tooth assemblies are known in the prior art and consist of irregular-shaped structures secured to a drawbar of a tractor for flexible movement on striking an object. These prior art devices are constructed similarly to well-known flexible rake tooth structures and do not present the new and novel structure, operation, and function of the applicant's device.

In preferred specific embodiments of the invention, new spring tooth assemblies for connection in series to the drawbar of a tractor are provided, each of which includes a spring tooth structure and a connector or bracket means. Each spring tooth structure is formed from an elongated bar material bent into an irregular somewhat S-shape configuration. The spring tooth structure has a large radius arcuate working section integral with a reversely curved connector section. The lower end of the working section is preferably formed with a diamond-shaped tip adapted for working engagement with the soil. The outer end of the connector section preferably has a flat linearly extended attachment portion having a hole therein for receiving a bolt member.

The preferred bracket means consists of a clamp member and a bolt member which cooperate to secure the spring tooth structure to the drawbar. The clamp member is of an L-shape having a support plate with the lower end thereof secured to a laterally extended spring holder section. The upper end of the support plate has a hole therein which receives the bolt member. The spring holder section is of U shape having a base portion and integral parallel leg portions whereby the spring tooth structure is mountable within the holder section. On use of the spring tooth assembly, the attachment portion of the spring tooth structure extends between the leg portions and in a parallel facing relationship with the support plate and having the drawbar extended therebetween. The bolt member is mounted through the holes in the attachment portion and the support plate and secured thereto to form a rigid spring tooth assembly.

Accordingly, it is an object of this invention to provide a new and novel spring tooth assembly.

Another object of this invention is to provide a spring tooth assembly having a unique configuration resulting in superior resiliency characteristics.

Still another object of this invention is to provide a spring tooth structure that is economical to manufacture, simple to use, and efficient in operation.

One other object of this invention is to provide a bracket means adapted to secure the spring tooth structure to the drawbar of a tractor in such a manner as to not restrict the resilient movement of the spring tooth structure.

A further object of this invention is to provide a spring tooth assembly that is readily attachable to the drawbar of a conventional tractor and having a unique spaced arrangement with the soil being worked to provide new and novel resiliency characteristics.

Various other objects, advantages and features of the invention will become apparent to those skilled in the art from the following discussion, taken in conjunction with the drawings, in which.

Figure 1:
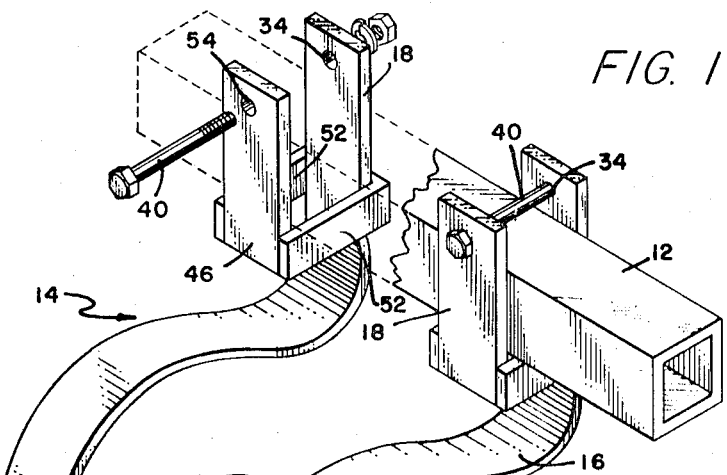
FIG. 1 is a perspective view of a pair of spring tooth assemblies of this invention illustrated as secured to a tractor drawbar.

The following is a discussion and description of preferred specific embodiments of the new spring tooth assembly of the invention, such being made with reference to the drawings, whereupon the same reference numerals are used to indicate the same or similar parts and/or structure. It is to be understood that this discussion and description is not to unduly limit the scope of the invention.

Referring now to the drawings in detail, and particularly to FIG. 1, a drawbar which is normally a necessary, integral part of a conventional tractor is shown at 12 to which is secured a spring tooth assembly of this invention indicated generally at 14. The spring tooth assembly 14 consists of a spring tooth structure or member 16 connected to the drawbar 12 by a bracket or clamp means 18.

Figure 2:
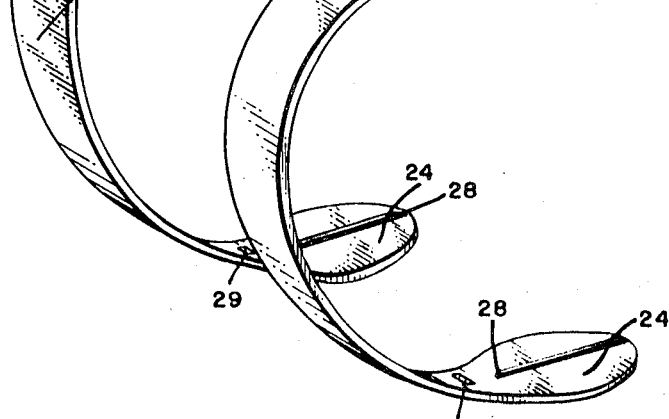
FIG. 2 is a side elevational view of the spring tooth assembly of this invention secured to the tractor drawbar.
Figure 3:
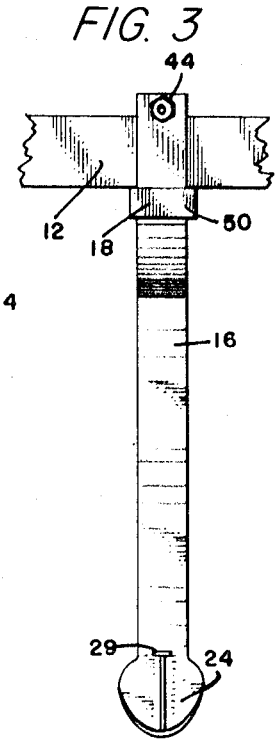
FIG. 3 is a front elevational view of the spring tooth assembly of this invention secured to the tractor drawbar.

As shown in FIG. 2, the spring tooth structure 16 is made of a heavy spring bar material of rectangular shape in transverse cross section bent into an irregular substantially S shape with the short parallel sides thereof aligned in parallel vertical planes. The spring tooth structure 16 has a substantially C-shaped working section 20 integral with a reversely curved connector section 22. The upper and lower portions of the working section 20 are of a substantially equal radius, respectively, with the lower portion terminating in a diamond-shaped working tip 24.

Figure 4:
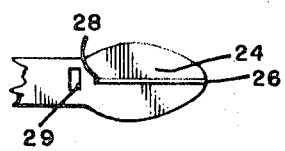
FIG. 4 is a fragmentary top plan view of a working tip of the spring tooth assembly of this invention.

More specifically, the tip 24 has substantially flat upper and lower surfaces converging toward a point 26. In a top plan view of the tip 24, the outer sides thereof converge outwardly and then inwardly to the point 26 so as to be of a diamond shape, (FIG. 4). It is seen, therefore, that the shape and structure of the tip 24 results in a pointed-spear-type configuration for efficient soil working. Additionally, the tip 24 has an upper central ridge 28 which aids in the separation of soil equally to both sides of the spring tooth structure 16 during the soil-working operation. A rectangular opening 29 rearwardly of the tip 24 is used for connecting a replacement tip to the spring tooth structure 16.

As shown in FIG. 2, the connector section 22 has a curved portion 30 of substantially equal radius integral with a linearly extended attachment portion 32. The upper end of the attachment portion 32 is formed with a hole 34 for reasons to become obvious. It is seen, therefore, that the spring tooth structure 16 is adapted for use with the attachment portion 32 extended vertically for securement to the drawbar 12 with the integral or transition portion of the connector section 22 and the working section 20 extended substantially horizontal and the lower portion or tip 24 of the working section 20 positioned to engage the soil at approximately a 30° to 45° angle.

As shown in FIG. 1, the bracket means 18 consist of a clamp member 36 and a bolt and nut assembly 11 having a bolt 40, a lock washer 42, and a nut 44. The clamp member 36 is of L shape having a support plate 46 secured as by welding to a U-shaped spring holder member 48 laterally extended therefrom. The spring holder member 48 has the base portion 50 integral with parallel leg portions 52 spaced apart a distance sufficient to receive the spring tooth structure 16 snugly therebetween. The upper end of the support plate 46 is formed with a hole 54 adapted to receive the bolt 40.

In the use and operation of the spring tooth assembly 14, the attachment portion 32 of the spring tooth structure 16 is inserted within the spring holder member 48 so as to be facing and parallel with the support plate 46 having the inner surfaces thereof in contact with opposite parallel vertical sides of the drawbar 12. In this position, the bolt 40 is inserted through the aligned holes 54 and 34 in the support plate 46 and the attachment portion 32, respectively, the washer 42 is mounted on the bolt 40, and the nut 44 is threaded thereupon to clamp the spring tooth assembly 14 to the drawbar 12. It is seen that the spring tooth structure 16 extends downwardly and rearwardly therefrom to present a soil-engageable tooth structure as shown in FIG. 2.

As in a conventional soil-working operation, a tractor having the spring tooth assemblies 14 of this invention is taken to a field whereupon the drawbar 12 is lowered to place the working sections 20 of the spring tooth structures 16 in engagement with the soil for a normal soil-busting-type operation. This presents a new and novel resilient tooth structure adapted to receive the sudden shocks frequently encountered in the soil-working operation and prevent breaking of the tooth structure.

For example, on encountering a heavier, harder soil or objects such as a rock or the like with the tip 24, the C-shaped working section 20 has a tendency to increase in radius thereby providing a resilient spring action. Additionally, the connector section 22 is flexed upwardly to decrease its radius to complement and add to the spring action of the working section 20. Furthermore, the new and novel bracket means 18 permits the spring tooth structure 16 to pivot rearwardly about the contacting lower edge of the drawbar 12 between the leg portions 52 adding to the flexibility and shock-absorbing characteristics of the spring tooth assembly 14.

It is obvious that the spring tooth assembly can be made of any material such as aluminum, steel, and plastic having the flexibility and strength requirements deemed necessary. Also the bracket means can be used on most presently available spring tooth structures to provide the above-mentioned flexibility thereto.

As will be apparent in the foregoing description of the preferred embodiments of applicant's spring tooth assembly, a relatively simple and inexpensive spring tooth structure has been provided which is easily attachable to the drawbars on conventional tractors so as to provide a new and novel resilient spring tooth assembly structure. Applicant's construction also eliminates a great deal of time-consuming and tedious work involved in removing and replacing spring tooth members which have become dull during a normal soil-breaking operation.

I claim:

1. A spring tooth for a drawn harrow-type, ground-soil-working instrument, said tooth having a first generally flat, vertical upper end portion adapted to be mounted in abutting relationship with respect to a horizontal drawbar, the opposite lower end of said tooth having a tip portion for soil engagement, said tip portion in operable position being at an acute angle of less than 45° to the ground extending rearwardly of the tooth, said tip portion terminating in a vertical plane rearwardly of the vertical plane of said upper end portion, a connector section consisting of a generally horizontal convoluted section depending from said upper end portion and extending rearwardly therefrom to a vertical plane rearward of the plane of said tip termination and vertically above the nadir of the curvature forming said convoluted section and an arcuate working section consisting of spring bar material having a radius of curvature substantially greater than and reversed from said connector section, said working section extending upwardly and rearwardly from said tip portion and connecting with the rearward end of said connector section at a substantially horizontal transition section, said transition section being in the same general horizontal plane as the point of transition from said upper end portion to said connector section to maximize height of connector section flexure, whereby in operation said working section is adapted to increase in radius of curvature when a soil obstruction is encountered and said connector section flexes upwardly, decreasing its radius of curvature.

2. The invention as set forth in claim 1, wherein said tip portion in operable position is at an acute angle of from 30° to 45° to the ground extending rearwardly of the tooth.

3. The invention as set forth in claim 1, including a drawbar rectangular in cross section to which said tooth is connected and wherein said upper end portion extends vertically with respect to said drawbar and abuts along its length a vertical forwardly facing of the bar forming a lower pivot point at the bottom edge of the drawbar, whereby said tooth, when flexed during operation, additionally pivots at the forward bottom edge of said bar.

4. The invention as set forth in claim 3 including means forming an aperture at the top of said vertical upper end portion above said drawbar, and clamp means, including said means forming an aperture extending laterally around said bar to clamp said tooth upper end portion to said bar.

5. The invention as set forth in claim 1, wherein said connector section is cuplike in cross section having its upper edges generally in the same horizontal plane, and wherein when said arcuate working section flexes during operation said tooth flexes about a point rearwardly of the upper end portion and forwardly of the tip portion.

6. A spring tooth assembly adapted for connection to the drawbar of a tractor for soil cultivation, comprising:

a. an irregular-shaped resilient spring tooth member having an arcuate working section integral with one end of a reversely curved connector section, b. means for connecting said tooth member to the drawbar with said connector section facing rearwardly and upwardly and said working section facing forwardly and downwardly, and rearward movement of said working section on striking an obstruction in the soil resulting in an opening of said arcuate section and a closing of said curved connector section, c. said means for connecting having a clamp bracket and detachable mounting means, said clamp bracket including a support portion having in one end thereof a laterally extended spring holder portion of substantially U shape, said detachable mounting means being extendable through the opposite end of said support portion and the outer end of said spring tooth member, said spring tooth member being mountable on the drawbar by said first-named mounting means and extendable through said spring holder portion to be securable against forward movement and flexible rearwardly about the drawbar, and d. said connector section having a curved portion of substantially equal radius and the radius decreasing on upward deflective movement of said working section providing for movement of said working section out of contact of the obstruction to prevent damage to said spring tooth member.

7. A spring tooth assembly as described in claim 6, wherein:

said spring tooth holder portion includes a base portion connected to parallel leg portions secured to said support portion and defines a central rectangular opening to receive said spring tooth member, said base portion restricting movement of said spring member in one direction with movement in the opposite direction restricted by the drawbar and wherein lateral movement is restricted by said leg portions.

* * * * *